US008175844B2

(12) United States Patent
Nobuyoshi et al.

(10) Patent No.: US 8,175,844 B2
(45) Date of Patent: May 8, 2012

(54) DETERMINING AN ENCODING TYPE OF DATA

(75) Inventors: Mori Nobuyoshi, Lorsch (DE);
Bernhard Schilling, Heidelberg (DE);
Martin Schmidt, Wiesloch (DE)

(73) Assignee: SAP AG, Walldorf (DE)

( * ) Notice: Subject to any disclaimer, the term of this patent is extended or adjusted under 35 U.S.C. 154(b) by 380 days.

(21) Appl. No.: 12/494,840

(22) Filed: Jun. 30, 2009

(65) Prior Publication Data
US 2010/0332184 A1 Dec. 30, 2010

(51) Int. Cl.
*G06F 17/18* (2006.01)
*G06F 17/30* (2006.01)
(52) U.S. Cl. ............... 702/179; 702/189; 707/796
(58) Field of Classification Search ............ 702/179, 702/181, 189
See application file for complete search history.

(56) References Cited

U.S. PATENT DOCUMENTS

| | | | | |
|---|---|---|---|---|
| 6,081,909 | A | * | 6/2000 | Luby et al. ............... 714/701 |
| 6,195,777 | B1 | * | 2/2001 | Luby et al. ............... 714/752 |
| 2009/0080788 | A1 | * | 3/2009 | Lynch et al. .............. 382/246 |
| 2009/0099884 | A1 | | 4/2009 | Hoefelmeyer et al. |

OTHER PUBLICATIONS

Amazing Applications of Probability and Statistics, Benford's Law http://www.intuitor.com/statistics/Benford's%20Law.html, Jun. 25, 2009.

* cited by examiner

*Primary Examiner* — Hal Wachsman
(74) *Attorney, Agent, or Firm* — Fish & Richardson P.C.

(57) ABSTRACT

Implementations of the present disclosure provide for determining an encoding type of data. Implementations include receiving a data set from a computer-readable storage medium, decoding the data set using a first encoding type to provide a first plurality of numbers, generating a first distribution based on the first plurality of numbers, decoding the data set using a second encoding type to provide a second plurality of numbers, and generating a second distribution based on the second plurality of numbers. An actual encoding type of the data set is determined based on the first distribution, the second distribution and an expected distribution, and the data set is processed based on the actual encoding type.

21 Claims, 8 Drawing Sheets

DETERMINING AN ENCODING TYPE OF DATA

BACKGROUND

In data processing, many computer languages require that arithmetic be carried out using standard formats and operations, such as floating-point decimal. Interchange formats are provided for exchanging data using a fixed length bit-string for a given interchange format. Encoding schemes are provided for the interchange formats, which encoding schemes enable encoding of the sign, exponent, and significant as a compressed sequence.

SUMMARY

Implementations of present disclosure include methods of determining an encoding type of data. In some implementations, a method includes receiving a data set from a computer-readable storage medium, decoding the data set using a first encoding type to provide a first plurality of numbers, generating a first distribution based on the first plurality of numbers, decoding the data set using a second encoding type to provide a second plurality of numbers, and generating a second distribution based on the second plurality of numbers. An actual encoding type of the data set is determined based on the first distribution, the second distribution and an expected distribution, and the data set is processed based on the actual encoding type.

In some implementations, determining an actual encoding type includes comparing the first distribution to the expected distribution, comparing the second distribution to the expected distribution, identifying at least one of the first and second distributions as corresponding to the expected distribution to provide an identified distribution, and selecting one of the first and second encoding types as the actual encoding type based on the identified distribution.

In some implementations, the method further includes determining a first test statistic based on the first distribution and the expected distribution, determining a second test statistic based on the second distribution and the expected distribution, and comparing each of the first test statistic and the second test statistic to a threshold, wherein selecting one of the first and second encoding types as the actual encoding type is based on a result of the comparing.

In some implementations, the first distribution corresponds to a frequency of values of a first digit of each number of the first plurality of numbers, and the second distribution corresponds to a frequency of values of a second digit of each number of the second plurality of numbers.

In some implementations, the method further includes determining that both the first distribution and the second distribution correspond to the expected distribution, generating a third distribution based on the first plurality of numbers, generating a fourth distribution based on the second plurality of numbers, and determining the actual encoding type of the data set based on the third distribution, the fourth distribution and a second expected distribution.

In some implementations, the actual encoding type includes one of densely packed decimal (DPD) encoding and binary encoding.

In some implementations, the expected distribution comprises a Benford's distribution.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is to say that methods in accordance with the present disclosure are not limited to the combinations of aspects and features specifically described herein, but also include any combination of the aspects and features provided.

The details of one or more embodiments of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

In computer processing, floating-point refers to a system of numerical representation, in which a string of digits represents a rational number. A numerical representation specifies a way of electronically storing a number that may be encoded as a string of digits. The term "floating-point" indicates that a radix point (e.g., a decimal point, or a binary point) can "float," or can be placed anywhere relative to the digits of the number. The position of the radix point is indicated separately in the internal representation. Logically, a floating-point number includes a signed digit string of a given length in a given base, and a signed integer exponent, also referred to as the characteristic or scale, which modifies the magnitude of the number. An advantage of floating-point representation, over other representations (e.g., fixed-point, and integer) is that it can support a much wider range of values. Although the floating-point representation needs slightly more storage to encode the position of the radix point, floating-point representations achieve a greater value range.

Over the last few decades, several standards have defined floating-point representations used in computer processing. One traditional standard provides a plurality of binary formats and for representing floating-point numbers. More recently, such standards have been expanded to further include a plurality of decimal formats for representing floating-point numbers. These standards can implement exchange encodings including a binary encoding and a decimal encoding (e.g., densely packed decimal (DPD) encoding). The implementation of different formats (e.g., binary and decimal formats) and encodings (e.g., binary and decimal encodings) presents various issues when processing data from disparate systems. For example, it may not be immediately clear whether a particular floating-point data set has been encoded using binary encoding or decimal encoding.

The present disclosure enables a data set to be analyzed to distinguish between binary and decimal encodings based on statistical distributions. In a specific implementation, the present disclosure enables a data set of decimal floating-point numbers to be analyzed to distinguish between binary and DPD encodings. To achieve this, it is initially determined that the data set is representative of decimal floating-point data of known length. That is to say, that the number of data values, or number in the data set is known. Such data sets are presented for execution of a particular procedure. Based on the context of the procedure, it can be determined that the data set includes decimal floating-point data, as opposed to text data, integer data, and/or special format data (e.g., a word processing document, or a presentation document), for example. Although the data set includes decimal floating-point data of know length, the particular encoding type that was used to encode the data set remains uncertain.

To determine which encoding was used to encode a particular data set, implementations of the present disclosure compare observed, or calculated distributions to a theoretical, or expected distribution. Although the present disclosure is provided in the context of the expected distribution being the Benford's distribution, it is appreciated that principles of the present disclosure can be implemented using other distributions, and is not limited to the Benford's distribution.

Figure 1A:
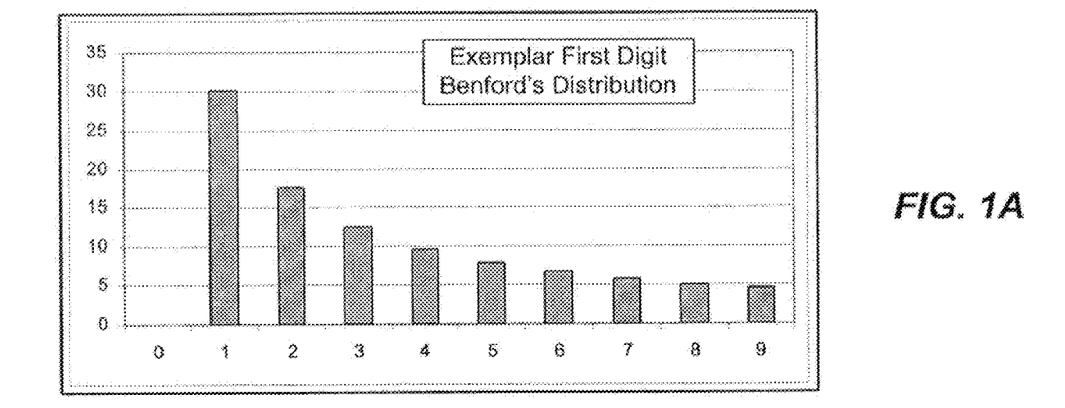
FIG. 1A is a graph illustrating an exemplar first digit distribution.

The Benford's distribution is based on Benford's law, which provides that the leading digit of the numbers in a list of numbers is distributed in a specific, non-uniform way. More specifically, the first digit of a multi-digit number has a value of "1" almost one third of the time, and larger values occur as the first digit with decreasing frequency. FIG. 1A illustrates an exemplar distribution (Benford's distribution) for the first digit of a multi-digit number. As seen in FIG. 1A, "1" is the first digit approximately 30% of the time, and "9" is the first digit less than 5% of the time. This distribution of first digits arises logically whenever a set of values is distributed logarithmically. More specifically, Benford's law provides that the leading digit d (d$\in$\{1, . . . , b–1\}) in base b (b$\geq$2) occurs with the following probability (P):

$$P(d) = \log_b(d+1) - \log_b(d) = \log_b\left(1 + \frac{1}{d}\right) \quad \text{Equation 1}$$

This quantity is exactly the space between d and d+1 in a logarithmic scale. In base 10, the leading, or first digits have the exemplar Benford's distribution of FIG. 1A.

Benford's law can be extended to digits beyond the first digit. More specifically, the probability of encountering a number starting with the string of digits "n" is provided by:

$$\log_{10}(n+1) - \log_{10}(n) = \log_{10}\left(1 + \frac{1}{n}\right). \quad \text{Equation 2}$$

This equation is provided using base 10 (i.e., b=10). The above equation can be used to determine the probability that a particular value occurs at a particular position within a number. For example, the probability that a "2" is encountered as the second digit is provided as:

$$\log_{10}\left(1 + \frac{1}{12}\right) + \log_{10}\left(1 + \frac{1}{22}\right) + \ldots + \log_{10}\left(1 + \frac{1}{92}\right) \approx 0.109. \quad \text{Equation 3}$$

Figure 1B:
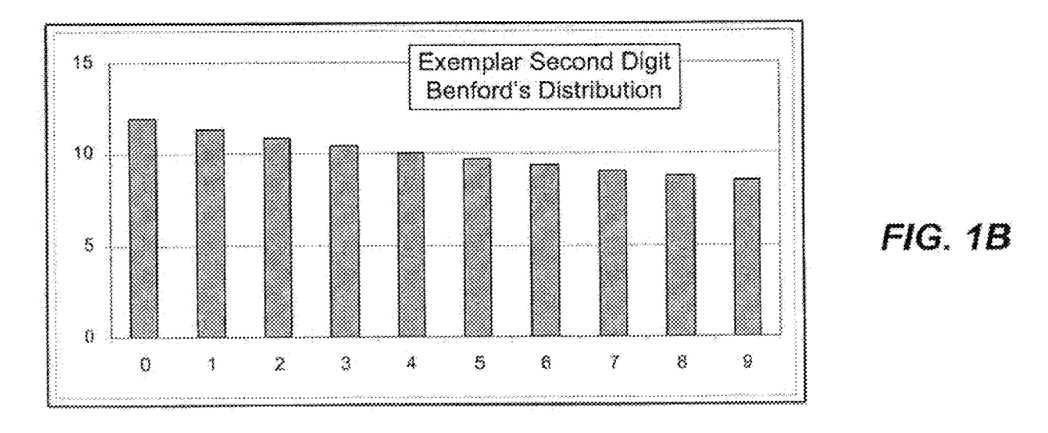
FIG. 1B is a graph illustrating an exemplar second digit distribution.
Figure 1C:
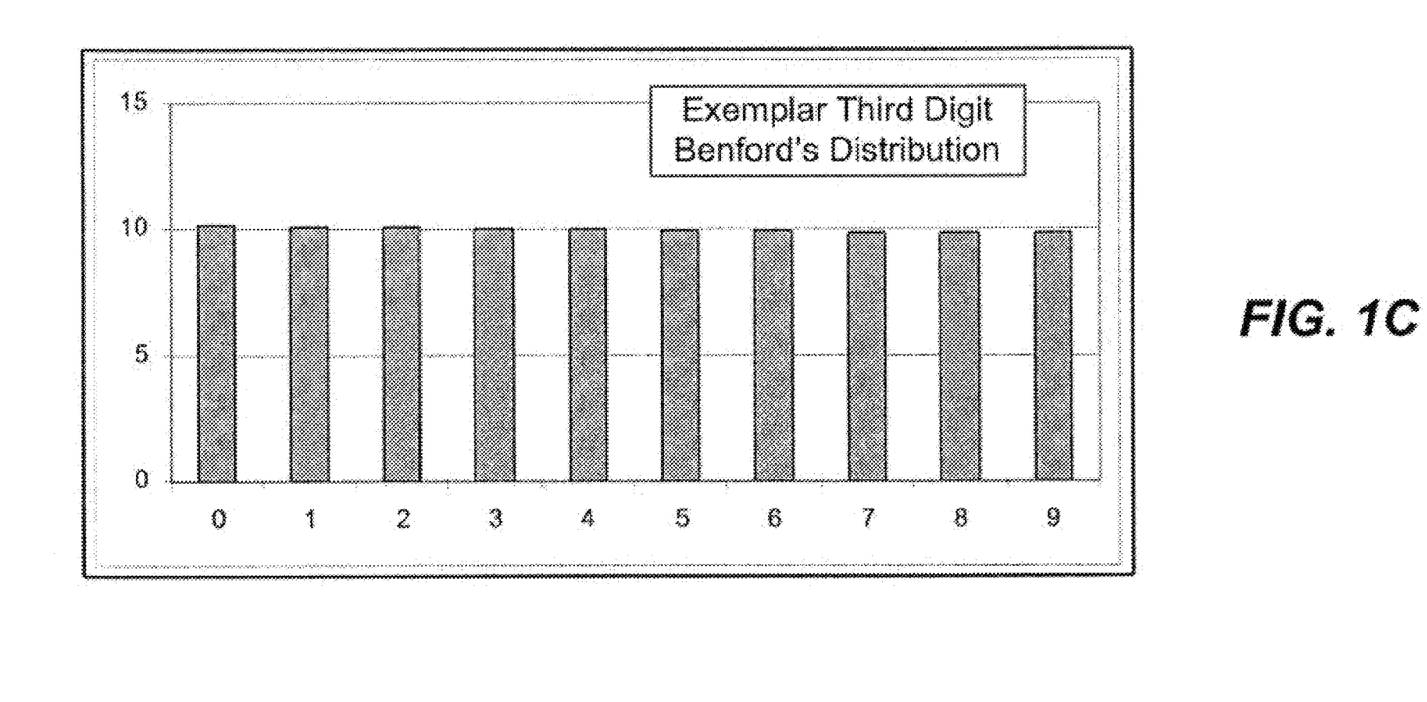
FIG. 1C is a graph illustrating an exemplar third digit distribution.

FIGS. 1B and 1C illustrate exemplar distributions (Benford's distributions) for the second and thirds digit of a multi-digit number, respectively. As evidenced in FIG. 1C, the distribution of the $n^{th}$ digit, as n increases, approaches a uniform distribution of approximately 10% for each of the ten possible digits.

Figure 2A:
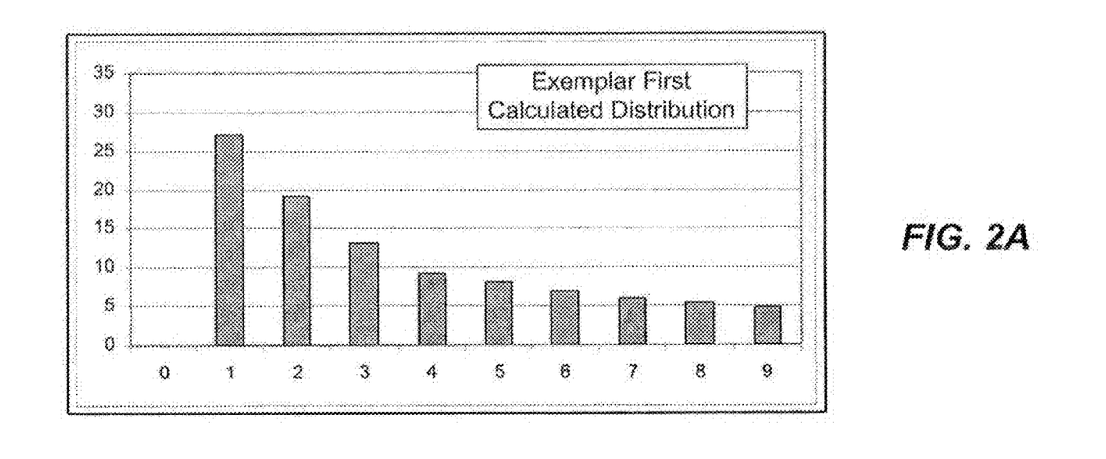
FIG. 2A is a graph illustrating an exemplar first calculated distribution in accordance with implementations of the present disclosure.

As discussed above, implementations of the present disclosure compare observed, or calculated distributions to a theoretical, or expected distribution to determine the encoding type of a particular data set. Initially, a first encoding type, either decimal encoding (e.g., DPD), or binary encoding (e.g.,), is assumed. The data set is decoded using the presumed first encoding type, and a list of floating-point numbers is provided from the data set. A first calculated distribution is calculated based on a common digit (e.g., the first digit) of each of the numbers of the data set. In the case of decimal encoding, the distribution can be provided as "distribution_DEC." and the distribution can be provided as "distribution_BIN," for binary encoding. FIG. 2A illustrates an exemplar first calculated distribution based on the first digits of a list of numbers generated using the first encoding type.

Figure 2B:
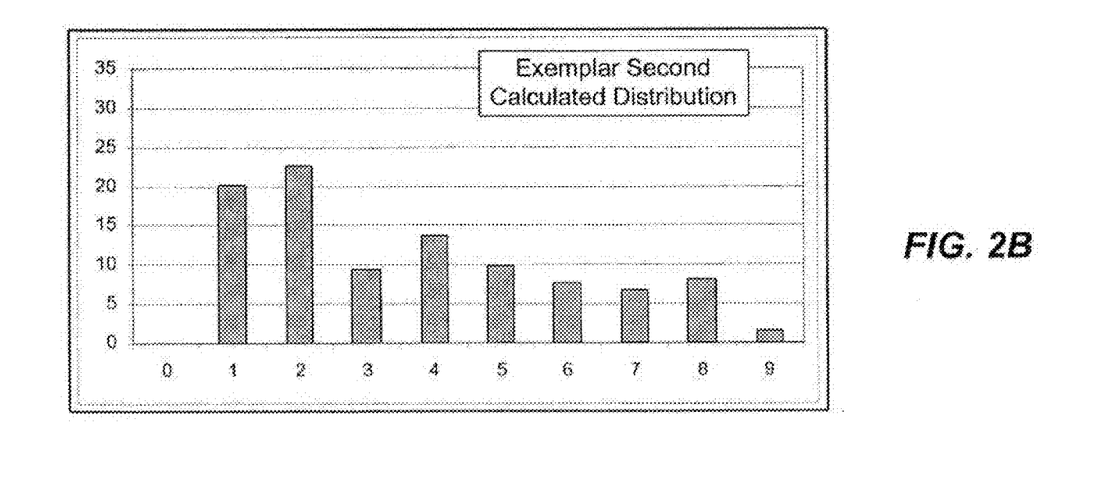
FIG. 2B is a graph illustrating an exemplar second calculated distribution in accordance with implementations of the present disclosure.

Subsequently, a second encoding type (the other of either decimal encoding, or binary encoding) is assumed. The data set is decoded using the presumed second encoding type, and a list of floating-point numbers is provided from the data set. A second calculated distribution is calculated based on a digit having a particular position within each of the numbers of the data set (e.g., the first digit). FIG. 2B illustrates an exemplar second calculated distribution based on the first digit of each of the numbers in the list of numbers generated using the second encoding type.

Figure 3A:
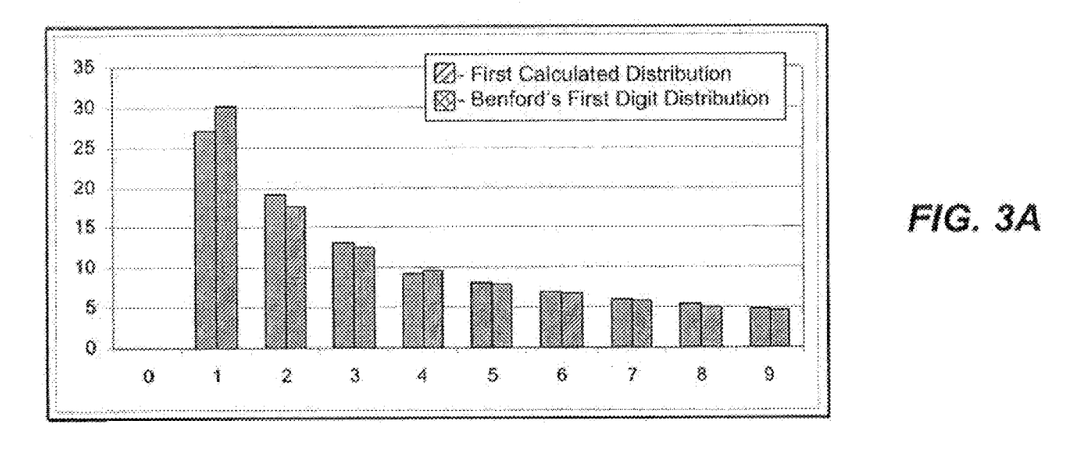
FIG. 3A is a graph illustrating a comparison between the exemplar distribution of FIG. 1A and the exemplar distribution of FIG. 2A.
Figure 3B:
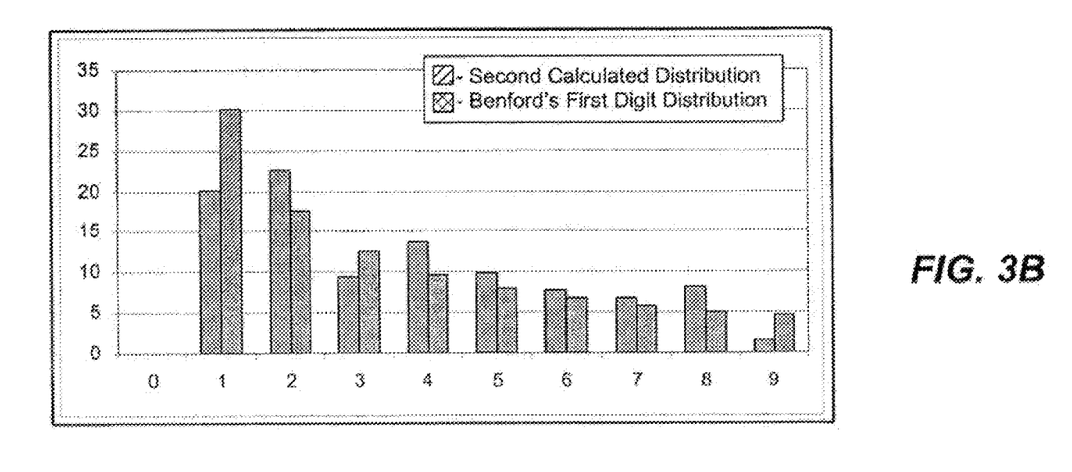
FIG. 3B is a graph illustrating a comparison between the exemplar distribution of FIG. 1A and the exemplar distribution of FIG. 2B.

Each of the first and second calculated, or observed distributions is compared to the expected first digit distribution, the first digit Benford's distribution in the present example. FIGS. 3A and 3B illustrates comparisons of the Benford's distribution of FIG. 1A to each of the first and second calculated distributions, respectively. The encoding type corresponding to the calculated distribution that is deemed to correspond to, or otherwise be a good fit to the Benford's distribution can be identified as the proper encoding type of the data set. In the exemplar, comparisons of FIGS. 3A and 3B, the first calculated distribution has a better fit to the Benford's distribution. Consequently, the first encoding type is identified as the encoding type of the subject data set.

If the list of numbers of the data set is of sufficient length, the distributions of the second and third digits can be evaluated in view of the corresponding Benford's distributions (e.g., Benford's distributions of FIGS. 1B and 1C, respectively). However, as the list becomes longer, and more digits besides the first digit are taken into account, the computational effort correspondingly increases. Consequently, an appropriate balance between accuracy of the result and the calculation effort should be considered.

Generally, the list of numbers should be greater than a threshold (e.g., at least 109 numbers long). More specifically, a common criterion for the minimum amount of data in each class is that there should be at least 5 values. For the Benford's distribution, in particular example, a share of 0.046 of all first digits to have the value 9 can be expected, which is the lowest probability of all of the other digits (i.e., 1-8). To ensure at least 5 values to be in the digit class '9', one needs at least 5/0.046=1.09 numbers in the list of numbers. For the distribution of the second and third digit, a slightly smaller minimum length of the number list is provided, because the distribution of these digits approaches a uniform distribution (e.g., 0.10 (or 10%) for each digit between 0 and 9). Consequently, a practical implementation of the present disclosure could only consider the first and/or the second digits.

In other implementations, a sequence of digits could be analyzed, for example, the first two digits, or the first three digits. Such an analysis can be achieved implementing Equation 3, for example. By way of non-limiting example, the digit sequence '999' has a probability of $4.3 \times 10^{-4}$, whereas the digit sequence '100' has a probability of $4.3 \times 10^{-2}$. Accordingly, the digit sequence '100' is 100 times more likely to occur in a given list of numbers than the digit sequence '999'. If considering a digit sequence including only the first two digits, approximately 1,000 numbers should be included in the number list to provide a sufficiently accurate distribution. If considering a sequence of digits including the first three digits, approximately 10,000 numbers should be included in the number list to provide a sufficiently accurate distribution. These thresholds (i.e., 1,000 and 10,000) are merely exemplar in nature, and implementations of the present disclosure are not limited to these values.

In one exemplar, practical implementation of digit sequences, it may be possible to compute values of an expected distribution for numbers of a certain data type (e.g., that may not comply with the Benford's distribution). By way of one non-limiting example, it may be known that numbers representing a product may have three non-zero digits at the beginning, two to six zero digits, and two to six non-zero digits at the end. It may be possible to either enter such expected distributions manually, or to analyze one or more digit sequences (e.g., the first three digits, the middle two to six digits, and/or the last two to six digits) to obtain such expected distributions.

By way of non-limiting example, the chi-square distribution can be implemented to compare the calculated distributions to the Benford's distribution. More specifically, the chi-square distribution can be implemented in the framework of a chi-square test for goodness of fit of an observed distribution to a theoretical, or expected distribution. In the present disclosure, the chi-square distribution can be implemented to provide a chi-square test for goodness of fit of each of the calculated distributions (i.e., the observed distribution) to the Benford's distribution (i.e., the theoretical distribution). More specifically, the chi-square test for goodness of fit can be implemented to test association of variables in two-way tables where the theoretical, or expected distribution is evaluated against the observed distribution. The chi-square test statistic is provided as:

$$X^2 = \sum \frac{(\text{observed} - \text{expected})^2}{\text{expected}} \quad \text{Equation 4}$$

If the chi-square test statistic is large, the observed and expected values are not close and the model is a poor fit to the data. If the chi-square test statistic is small, the observed and expected values are close and the model is a good fit to the data. In the present disclosure, a chi-square test statistic is determined for each of the calculated distributions with respect to the Benford's distribution. Consequently, a first chi-square test statistic, statistic_DEC ($X_{DEC}^2$), and a second chi-square test statistic, statistic_BIN ($X_{BIN}^2$), are calculated for the given data set. Each of the statistic_DEC and statistic_BIN can initially be compared to a so-called cut-off, or threshold value. The threshold value can be determined in a known manner based on a so-called significance value ($\alpha$), and the degrees of freedom of the calculated distribution. Exemplar significance values can include, but are not limited to, 0.10, 0.05, and 0.01. The significance value provides a confidence level, and indicates how many analyses out of a given number of different analyses will yield an incorrect result. For example, if $\alpha$ is equal to 0.05, one analysis out of twenty analyses will be incorrect (e.g., a 5% error rate). As another example, if $\alpha$ is equal to 0.10, one analysis out of ten analyses will be incorrect (e.g., a 10% error rate). Generally, the threshold value can be determined from standard tables based on a given probability P, which can be determined as $P=1-\alpha$, and further based on a given degree of freedom of the chi square distribution. An exemplar threshold would be 15.51 for 8 degrees of freedom and $\alpha=0.05$. An exemplar table can be found in the "Handbook of Mathematics," by I. N. Bronshtein and K. A. Semendyayev, Springer, 3rd edition (May 16, 1997), for example.

If both the statistic_DEC, or the statistic_BIN is greater than the threshold value (e.g., 1.5.51), neither of the calculated distributions is deemed to be a good fit, or otherwise correspond to the Benford's distribution. Consequently, an alternative method could be pursued to determine the encoding type of the data set. If the statistic_DEC is less than the threshold, and the statistic_BIN is greater than the threshold, the distribution_DEC is deemed to be a good fit, or otherwise correspond to the Benford's distribution. In such a case, the decimal encoding is selected as the encoding type of the data set. If the statistic_BIN is less than the threshold, and the statistic_DEC is greater than the threshold, the distribution_BIN is deemed to be a good fit, or otherwise correspond to the Benford's distribution. In such a case, the binary encoding is selected as the encoding type of the data set.

In some cases, both the statistic_DEC and the statistic_BIN are less than the threshold. Consequently, both the distribution_DEC and the distribution_BIN is deemed to be a good fit to the Benford's distribution. In one implementation, because both of the calculated distributions are deemed to be a good fit, neither encoding can be determined to be the encoding type of the data set. In other implementations, the statistic_DEC and the statistic_BIN can be further analyzed to determine which encoding is the appropriate encoding. By way of one non-limiting example, the test statistic having the lowest value could be deemed to be a better fit, and the corresponding encoding can be determined to be the encoding type of the data set. In other implementation, further analysis could be implemented using other statistical methods such as the Kolmogorow-Smimow test.

If neither encoding can be deemed to be the encoding type of the data set based on the test statistics calculated for the first digit distribution, the second, third and/or other subsequent digits, or a sequence of digits can be processed in accordance with the above methodology. More specifically, calculated distributions for the second digit can be calculated and compared to the expected distribution for second digits (e.g., the second digit Benford's distribution of FIG. 1B). Chi-square test statistics can be calculated based on the calculated distributions for the second digit, and the encoding type could be determined based thereon. Calculated distributions for subsequent digits (e.g., the third digit), or sequence of digits could also be calculated and compared to the expected distribution for the corresponding subsequent digit (e.g., the third digit Benford's distribution of FIG. 1C), or sequence of digits. Chi-square test statistics can be calculated based on the calculated distributions for the subsequent digit(s), and the encoding type could be determined based thereon.

Figure 4:
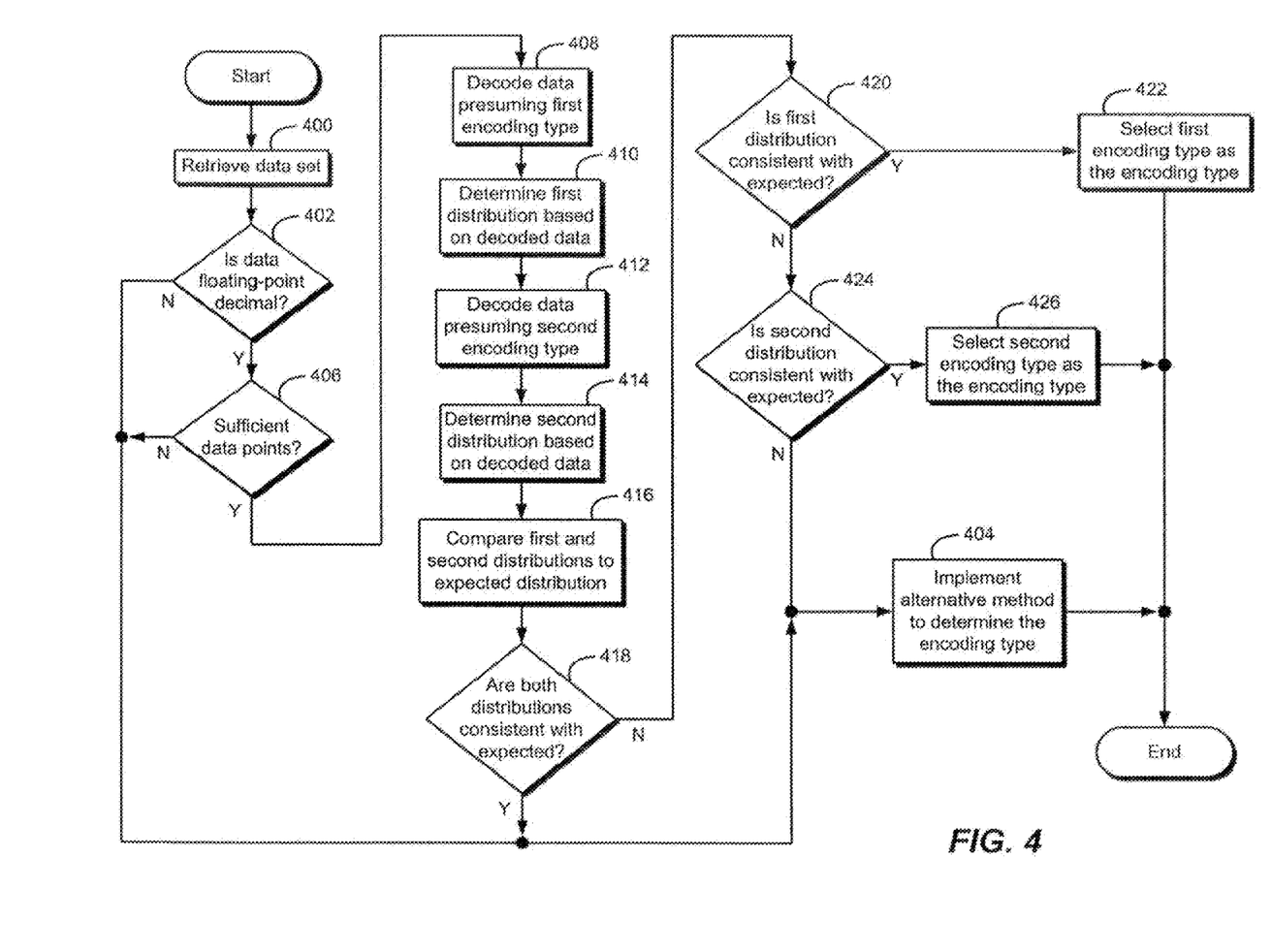
FIG. 4 is a flowchart illustrating exemplar steps that can be executed to determine an encoding type in accordance with implementations of the present disclosure.

Referring now to FIG. 4, a flowchart illustrates exemplar steps that can be executed in accordance with implementations of the present disclosure. In step 400, a data set is retrieved. In step 402, it is determined whether the data contained in the data set includes floating-point decimal data. If the data does not include floating-point decimal data, the flowchart continues in step 404. If the data does include floating-point decimal data, the flowchart continues in step 406. In step 404, an alternative method to determine the encoding type of the data set can be implemented, and the flowchart ends.

An exemplar alternative method can determining the number of bit combinations provided in the data set. For example, DPD encoding uses only 1000 out of 1024 bit combinations for each group of three digits. If one or more bit combinations in the data set is undefined in DPD encoding, the actual encoding type must be binary. Still another exemplar alternative method can include analyzing range of numbers of the data set. More specifically, the range of numbers that can be represented by decimal floating-point numbers is significantly larger than that expected in real data sets. For example, for 64-bit decimal floating-point, the range of numbers is approximately $10^{-383}$ to $10^{384}$. Depending on the application, a criterion can be defined. An exemplar criterion can include: If a number that is larger than $10^{20}$, or smaller than $10^{-20}$ is present in the data set, it can be assumed that the wrong encoding type was used to decode the data set. The appropriate upper and lower threshold values will depend on the application.

In step 406, it is determined whether the data set includes sufficient data points. In other words, it is determined whether the list of numbers provided in the data set is of sufficient length to determine accurate distributions. If the data set does not include a sufficient number of data points, the flowchart continues in step 404, as discussed above. If the data points do include a sufficient number of data points, the data is decoded presuming a first encoding type in step 408. In step 410, a first distribution (e.g., the exemplar first calculated distribution of FIG. 2A) is determined based on the decoded data. In step 412, the data is decoded presuming a second encoding type.

In step 414, a second distribution (e.g., the exemplar second calculated distribution of FIG. 2B) is determined based on the decoded data.

In step 416, the first and second calculated distributions are each compared to an expected distribution (e.g., the Benford's distribution). In step 418, it is determined whether both calculated distributions are consistent with, or are otherwise good fits with the expected distribution. If both calculated distributions are a good fit with the expected distribution, the flowchart continues in step 404, as discussed above. In other implementations, however, further processing of the calculated distributions could be implemented to determine the encoding type, if both calculated distributions are a good fit. In other implementations, other calculated distributions (e.g., for the second and/or third) can be calculated and processed to determine the encoding type, if both of the already determined calculated distributions are a good fit.

In step 420, it is determined whether the first distribution is consistent with, or is otherwise a good fit to the expected distribution. If the first distribution is consistent with the expected distribution, the flowchart continues in step 422. If the first distribution is not consistent with the expected distribution, the flowchart continues in step 424. In step 422, the first encoding type is selected as the encoding type, and the flowchart ends. In step 424, it is determined whether the second distribution is consistent with, or is otherwise a good fit to the expected distribution. If the second distribution is consistent with the expected distribution, the flowchart continues in step 426. If the second distribution is not consistent with the expected distribution, the flowchart continues in step 404, as discussed above. In step 426, the second encoding type is selected as the encoding type, and the flowchart ends.

Figure 5:
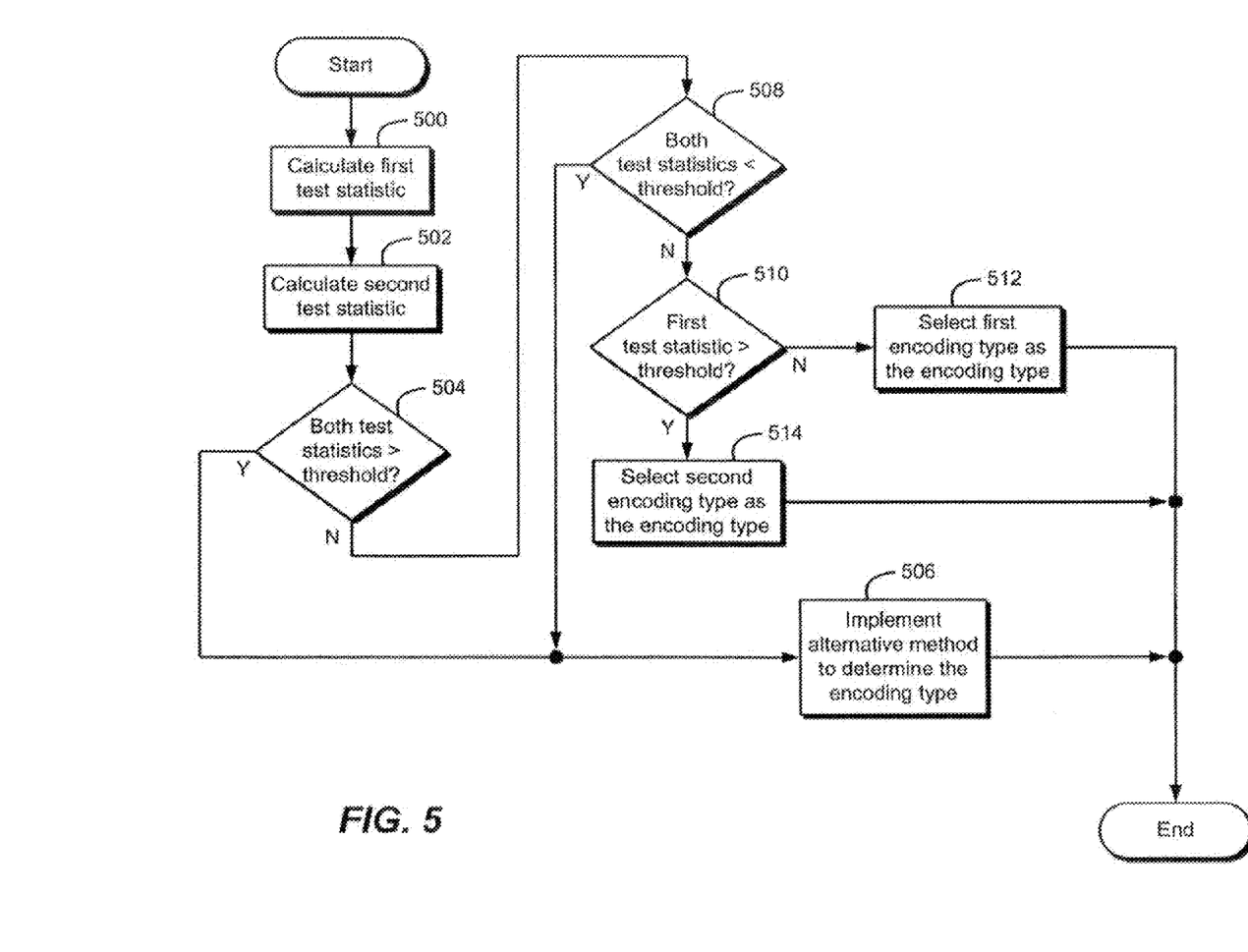
FIG. 5 is a flowchart illustrating exemplar steps that can be executed to compare calculated distributions to an expected distribution in accordance with implementations of the present disclosure.

Referring now to FIG. 5, a flowchart illustrates exemplar steps that can be executed to achieve the distribution comparisons in accordance with implementations of the present disclosure. In step 500, a first test statistic is calculated based on the first calculated distribution and the expected distribution. In step 502, a second test statistic is calculated based on the second calculated distribution and the expected distribution. In step 504, it is determined whether both the first and second test statistics is greater than the threshold, or cut-off. If both the first and second test statistics are greater than the threshold, neither the first calculated distribution nor the second calculated distribution is deemed to be a good fit to the expected distribution, and the flowchart continues in step 506. If at least one of the first and second test statistics is greater than the threshold, at either the first calculated distribution or the second calculated distribution is deemed to be a good fit to the expected distribution, and the flowchart continues in step 508. In step 506, an alternative method can be implemented to determine the encoding type, and the flowchart ends.

In step 508, it is determined whether both the first and second test statistics is less than the threshold. If both the first and second test statistics are less than the threshold, both the first and second calculated distributions are deemed to be a good fit to the expected distribution, and the flowchart continues in step 506, discussed above. In other implementations, however, further processing of the calculated distributions could be implemented to determine the encoding type, if both calculated distributions are a good fit. In other implementations, other calculated distributions and corresponding test statistics (e.g., for the second and/or third) can be calculated and processed to determine the encoding type, if both of the already determined calculated distributions are a good fit.

If both the first and second test statistics are not less than the threshold, only one test statistic is less than the threshold, and the flowchart continues in step 510. In step 510, it is determined whether the first test statistic is greater than the threshold. If the first test statistic is not greater than the threshold, the flowchart continues in step 512. If the first test statistic is greater than the threshold, the flowchart continues in step 514. In step 512, the first encoding type is selected as the encoding type, and the flowchart ends. In step 514, the second encoding type is selected as the encoding type, and the flowchart ends.

Figure 6:
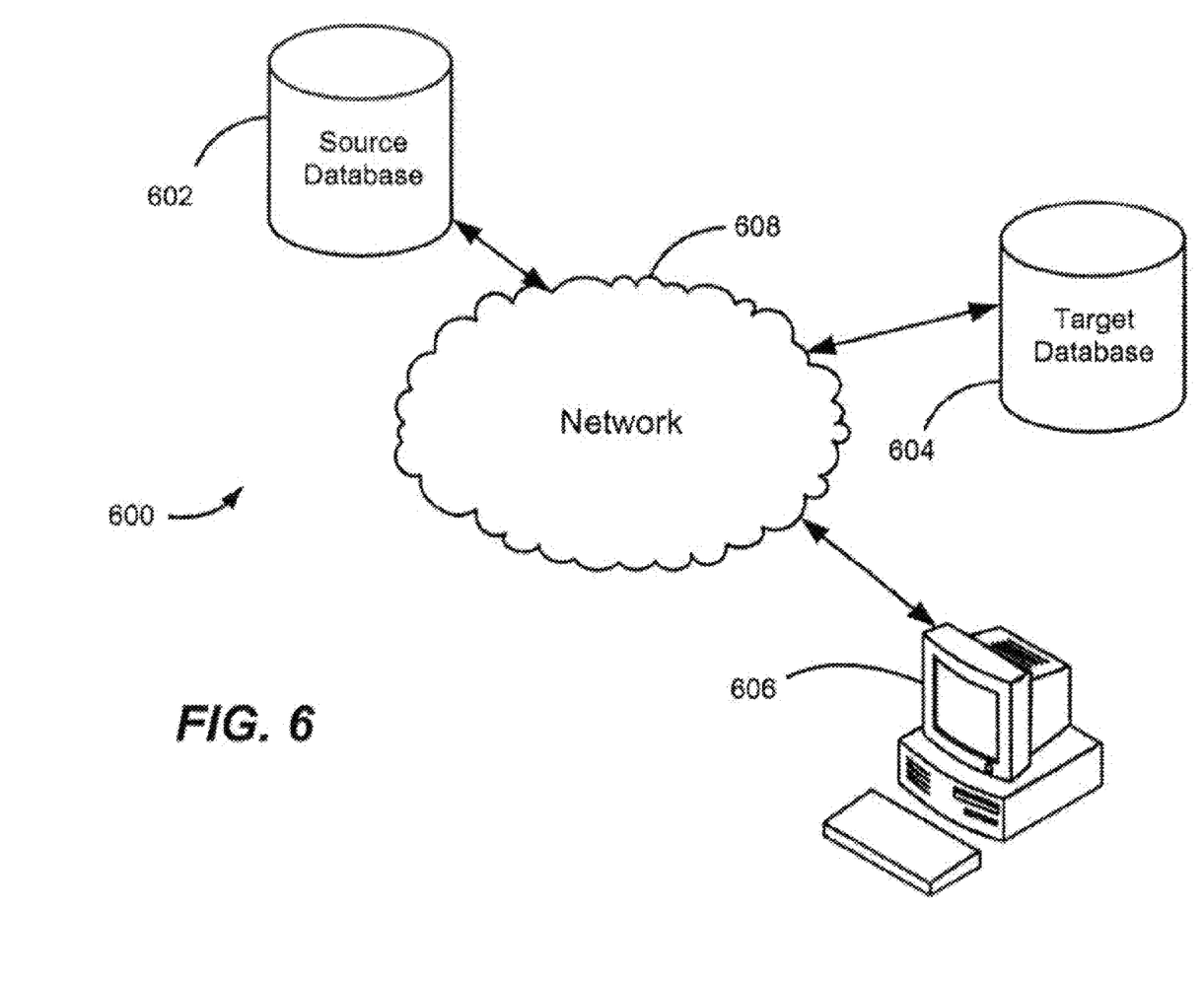
FIG. 6 is an exemplar environment for practical execution of implementations of the present disclosure.

Referring now to FIG. 6, an exemplar environment 600 is illustrated, in which encoding type determination in accordance with the present disclosure can be implemented. The exemplar environment 600 can be implemented to migrate stored data, for example, and includes a source database 602, a target database 604, an administrator computer 606, and a network. Each of the source database 602, the target database 604 and the administrator computer 606 can communicate with one another through the network 608. The network 608 can include, but is not limited to, a local area network (LAN), a wide area network (WAN), a wireless LAN (WLAN), a metropolitan area network (MAN), a personal area network (PAN), the Internet, and/or combinations thereof.

In an exemplar implementation, an administrator using the administrator computer 606 seeks to transfer one or more data sets from the source database 602 to the target database 604. The administrator, however, may be unaware of the particular coding type that was used to encode the data sets at the source database 602. For example, the data stored in the target database may be required to be encoded using a particular format. Consequently, the administrator should initially determine what encoding was used to encode the data sets stored in the source database 602. If that encoding type conforms to the encoding type used for the target database 604, to which the data set is to be transferred, the transfer can occur without further manipulation of the data set. If, however, the encoding type used for the source database 602 does not conform to that of the target database 604, the administrator should convert the encoding format before during transfer of the data set to the target database 604.

Implementations of the present disclosure can be employed to determine the encoding type of the data sets stored in the source database. More specifically, and by way of non-limiting example, the administrator can use the administrator computer 606 to process one or more data sets in accordance with the present disclosure. In short, the administrator computer can be used to process the data set(s), to calculate the calculated distributions, and to compare the calculated distributions to the expected distribution. Upon determining the encoding type of the data set(s), the administrator computer can further be implemented to automatically convert the encoding prior to transferring the data set(s) to the target database, such as in the case where the encoding type of the source database 602 is different to that of the target database 604.

Practical execution of implementations of the present disclosure are not limited to the database migration scenario discussed above with reference to FIG. 6. Other scenarios can include, but are not limited to, a web-based application executed using a client that implements a first encoding type receiving data from a data source (e.g., an application server) that implements a second encoding type, and/or reading data using a processor that implements a first encoding type from an archive that stores the data using a second encoding type.

Figure 7:
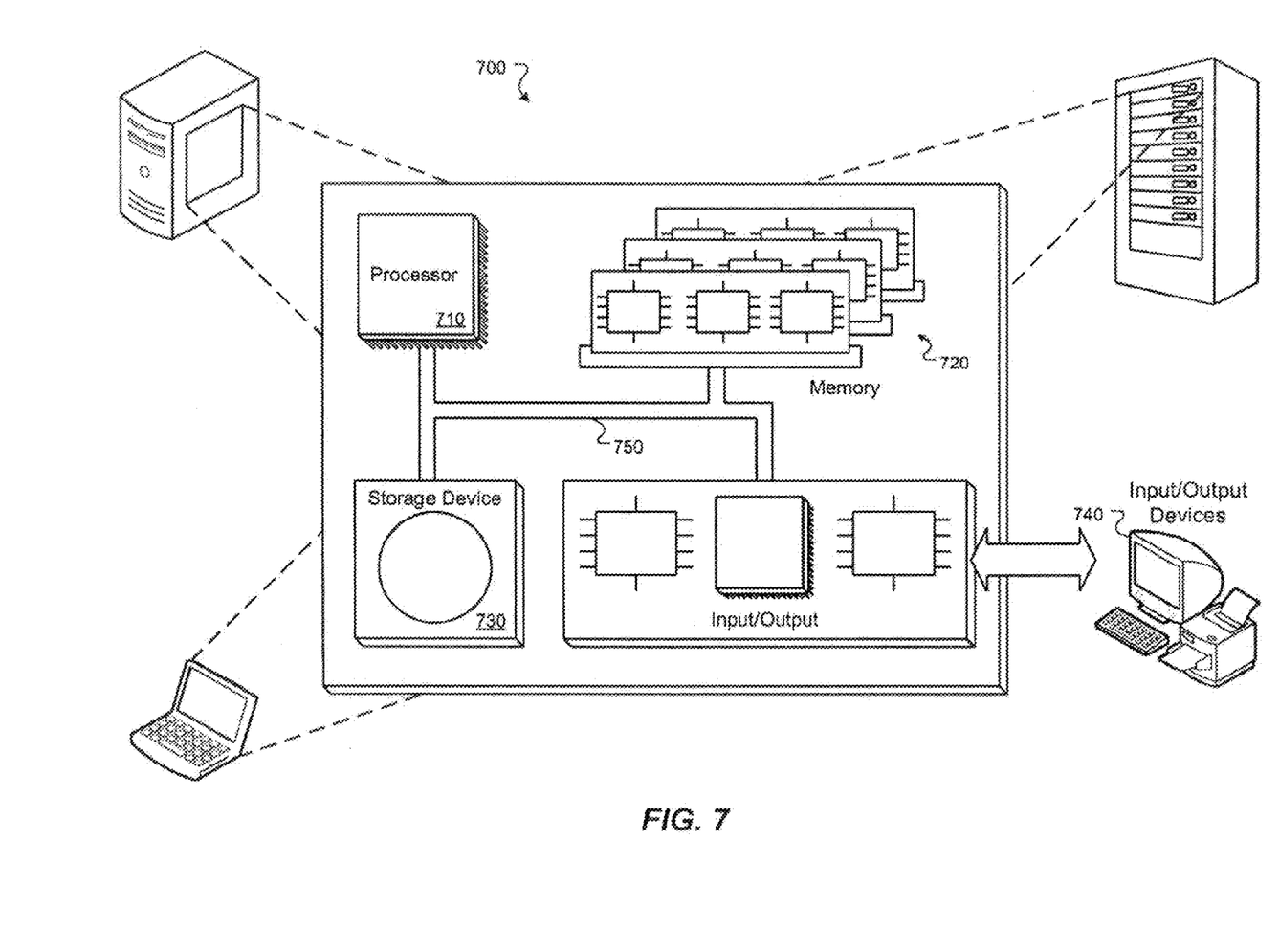
FIG. 7 is a schematic illustration of exemplar computer systems that can be used to execute implementations of the present disclosure.

Referring now to FIG. 7, a schematic diagram of an exemplar computer system 700 is provided. The system 700 can be used for the operations described in association with the methods described with reference to FIGS. 1A-6 according to one implementation. The system 700 includes a processor 710, a memory 720, a storage device 730, and an input/output device 740. Each of the components 710, 720, 730, and 740 are interconnected using a system bus 750. The processor 710 is operable to process instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In one implementation, the memory 720 is a computer-readable medium. In one implementation, the memory 720 is a volatile memory unit. In another implementation, the memory 720 is a non-volatile memory unit. The storage device 730 is operable to provide mass storage for the system 700. In one implementation, the storage device 730 is a computer-readable medium. In various different implementations, the storage device 730 may be a floppy disk device, a hard disk device, an optical disk device, or a tape device. The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method of determining an encoding type of data, the computer-implemented method being executed using one or more processors and comprising:
    receiving a data set from a computer-readable storage medium;
    decoding, using the one or more processors, the data set using a first encoding type to provide a first plurality of numbers;
    generating, using the one or more processors, a first distribution based on the first plurality of numbers;
    decoding, using the one or more processors, the data set using a second encoding type to provide a second plurality of numbers;
    generating, using the one or more processors, a second distribution based on the second plurality of numbers;
    determining, using the one or more processors, an actual encoding type of the data set based on the first distribution, the second distribution and an expected distribution; and
    processing, using the one or more processors, the data set based on the actual encoding type.

2. The computer-implemented method of claim 1, wherein determining an actual encoding type comprises:
    comparing the first distribution to the expected distribution;
    comparing the second distribution to the expected distribution;
    identifying at least one of the first and second distributions as corresponding to the expected distribution to provide an identified distribution; and
    selecting one of the first encoding type and the second encoding type as the actual encoding type based on the identified distribution.

3. The computer-implemented method of claim 1, further comprising:
    determining a first test statistic based on the first distribution and the expected distribution;
    determining a second test statistic based on the second distribution and the expected distribution; and
    comparing each of the first test statistic and the second test statistic to a threshold, wherein selecting one of the first encoding type and the second encoding type as the actual encoding type is based on a result of the comparing.

4. The computer-implemented method of claim 1, wherein the first distribution corresponds to a frequency of values of a first digit of each number of the first plurality of numbers, and the second distribution corresponds to a frequency of values of a second digit of each number of the second plurality of numbers.

5. The computer-implemented method of claim 1, further comprising:
    determining that both the first distribution and the second distribution correspond to the expected distribution;
    generating a third distribution based on the first plurality of numbers;
    generating a fourth distribution based on the second plurality of numbers; and
    determining the actual encoding type of the data set based on the third distribution, the fourth distribution and a second expected distribution.

6. The computer-implemented method of claim 1, wherein the actual encoding type includes one of a decimal encoding and a binary encoding.

7. The computer-implemented method of claim 1, wherein the expected distribution comprises a Benford's distribution.

8. A non-transitory computer-readable storage medium coupled to one or more processors and having instructions stored thereon which, when executed by the one or more processors, cause the one or more processors to perform operations for determining an encoding type of data, the operations comprising:
    receiving a data set from a remote computer-readable storage medium;
    decoding the data set using a first encoding type to provide a first plurality of numbers;
    generating a first distribution based on the first plurality of numbers;
    decoding the data set using a second encoding type to provide a second plurality of numbers;
    generating a second distribution based on the second plurality of numbers;
    determining an actual encoding type of the data set based on the first distribution, the second distribution and an expected distribution; and
    processing the data set based on the actual encoding type.

9. The non-transitory computer-readable storage medium of claim 8, wherein determining an actual encoding type comprises:
    comparing the first distribution to the expected distribution;

comparing the second distribution to the expected distribution;
identifying at least one of the first and second distributions as corresponding to the expected distribution to provide an identified distribution; and
selecting one of the first encoding type and the second encoding type as the actual encoding type based on the identified distribution.

10. The non-transitory computer-readable storage medium of claim 8, wherein the operations further comprise:
determining a first test statistic based on the first distribution and the expected distribution;
determining a second test statistic based on the second distribution and the expected distribution; and
comparing each of the first test statistic and the second test statistic to a threshold, wherein selecting one of the first encoding type and the second encoding type as the actual encoding type is based on a result of the comparing.

11. The non-transitory computer-readable storage medium of claim 8, wherein the first distribution corresponds to a frequency of values of a first digit of each number of the first plurality of numbers, and the second distribution corresponds to a frequency of values of a second digit of each number of the second plurality of numbers.

12. The non-transitory computer-readable storage medium of claim 8, wherein the operations further comprise:
determining that both the first distribution and the second distribution correspond to the expected distribution;
generating a third distribution based on the first plurality of numbers;
generating a fourth distribution based on the second plurality of numbers; and
determining the actual encoding type of the data set based on the third distribution, the fourth distribution and a second expected distribution.

13. The non-transitory computer-readable storage medium of claim 8, wherein the actual encoding type includes one of a decimal encoding and a binary encoding.

14. The non-transitory computer-readable storage medium of claim 8, wherein the expected distribution comprises a Benford's distribution.

15. A system for determining an encoding type of data, comprising:
one or more processors; and
a computer-readable storage device coupled to the one or more processors, and having instructions stored thereon which, when executed by the one or more processors, cause the one or more processors to perform operations for determining an encoding type of data, the operations comprising:
receiving a data set from a remote computer-readable storage medium;
decoding the data set using a first encoding type to provide a first plurality of numbers;
generating a first distribution based on the first plurality of numbers;
decoding the data set using a second encoding type to provide a second plurality of numbers;
generating a second distribution based on the second plurality of numbers;
determining an actual encoding type of the data set based on the first distribution, the second distribution and an expected distribution; and
processing the data set based on the actual encoding type.

16. The system of claim 15, wherein determining an actual encoding type comprises:
comparing the first distribution to the expected distribution;
comparing the second distribution to the expected distribution;
identifying at least one of the first and second distributions as corresponding to the expected distribution to provide an identified distribution; and
selecting one of the first encoding type and the second encoding type as the actual encoding type based on the identified distribution.

17. The system of claim 15, wherein the operations further comprise:
determining a first test statistic based on the first distribution and the expected distribution;
determining a second test statistic based on the second distribution and the expected distribution; and
comparing each of the first test statistic and the second test statistic to a threshold, wherein selecting one of the first encoding type and the second encoding type as the actual encoding type is based on a result of the comparing.

18. The system of claim 15, wherein the first distribution corresponds to a frequency of values of a first digit of each number of the first plurality of numbers, and the second distribution corresponds to a frequency of values of a second digit of each number of the second plurality of numbers.

19. The system of claim 15, wherein the operations further comprise:
determining that both the first distribution and the second distribution correspond to the expected distribution;
generating a third distribution based on the first plurality of numbers;
generating a fourth distribution based on the second plurality of numbers; and
determining the actual encoding type of the data set based on the third distribution, the fourth distribution and a second expected distribution.

20. The system of claim 15, wherein the actual encoding type includes one of a decimal encoding and a binary encoding.

21. The system of claim 15, wherein the expected distribution comprises a Benford's distribution.

* * * * *